UNITED STATES PATENT OFFICE.

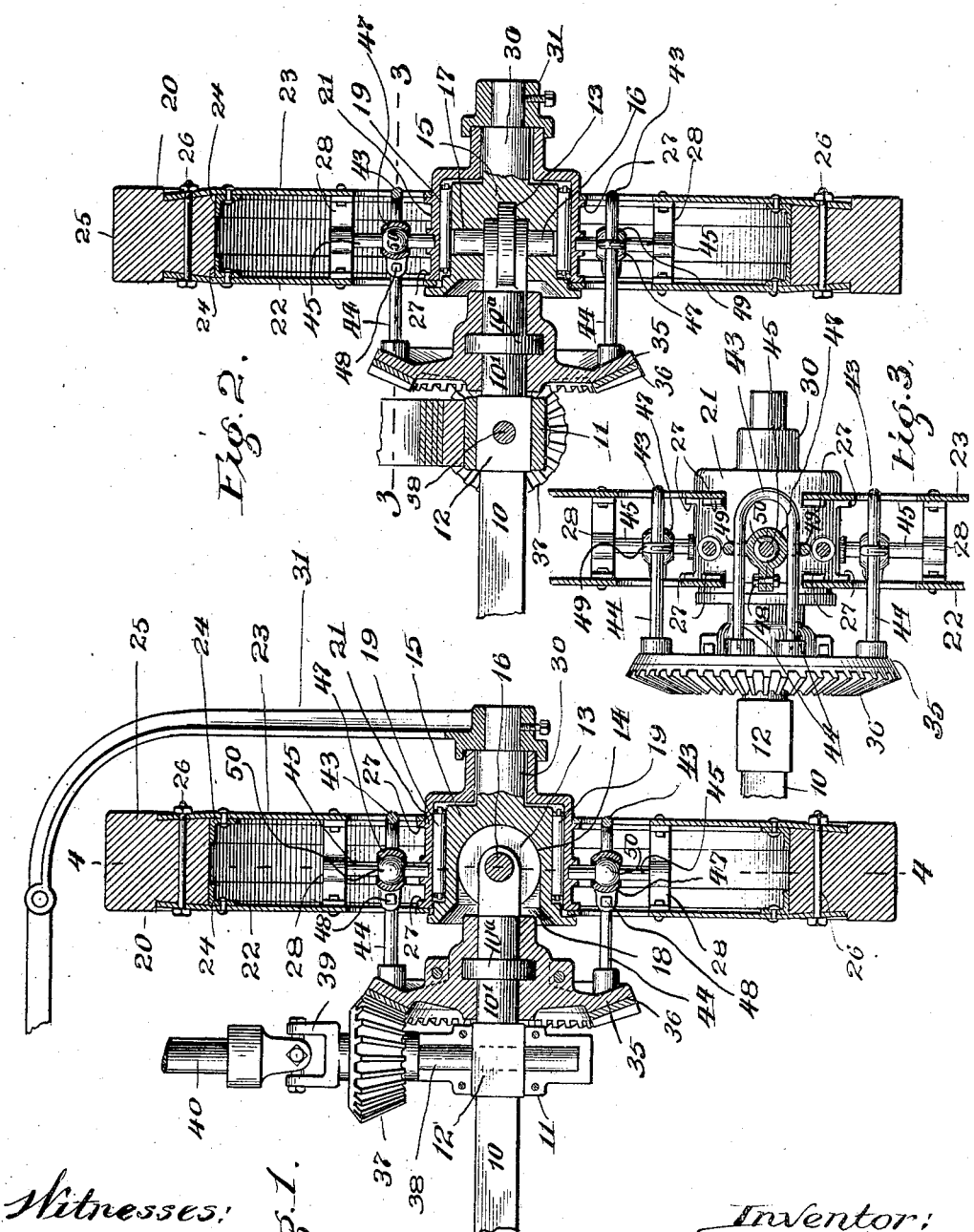

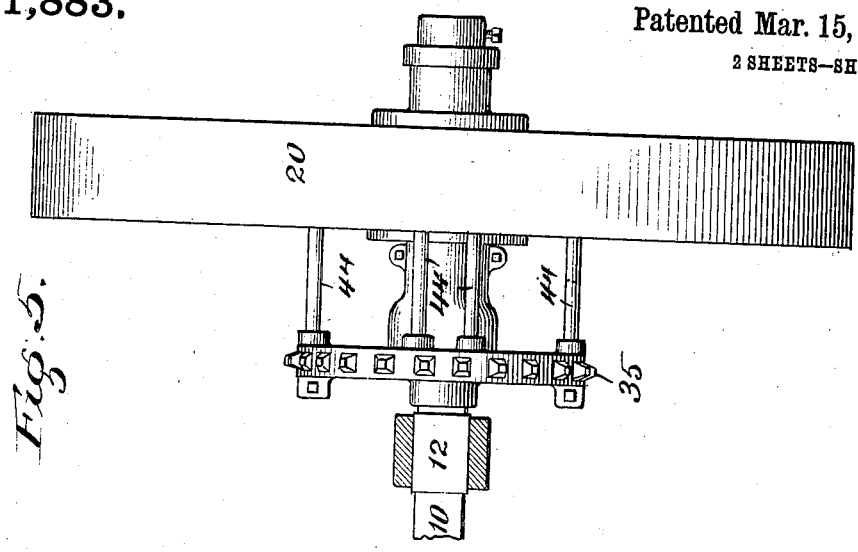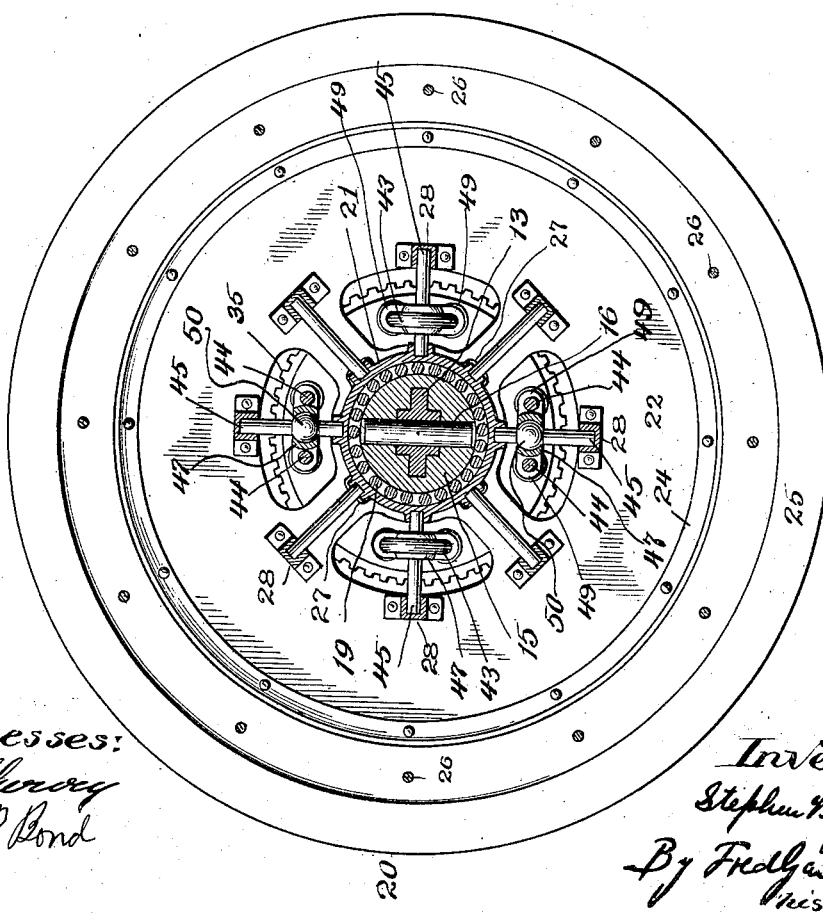

STEPHEN B. GRAY, OF JACKSONVILLE, ILLINOIS; BARTLETT S. GRAY EXECUTOR OF SAID STEPHEN B. GRAY, DECEASED.

DIRIGIBLE-WHEEL MOUNT.

951,883.  Specification of Letters Patent.  Patented Mar. 15, 1910.

Application filed February 13, 1907. Serial No. 357,184.

*To all whom it may concern:*

Be it known that I, STEPHEN B. GRAY, a resident of Jacksonville, in the county of Morgan and State of Illinois, have invented certain new and useful Improvements in Dirigible-Wheel Mounts, of which the following is a full, clear, and exact description.

The invention relates to dirigible wheel-mounts such as are used in motor-vehicles.
The invention designs to provide an improved construction for a mount which permits the wheel to be swung laterally to steer the vehicle and also an improved mount for a dirigible wheel combined with a driving-connection whereby the wheel may be constantly driven despite movement of the wheel about its swivel-connection with the frame or angular movement necessary in steering a vehicle.
The invention consists in the several novel features of construction hereinafter set forth and more particularly defined by claims at the conclusion hereof.

In the drawings: Figure 1 is a horizontal section (parts being shown in elevation) of a wheel-mount embodying the invention. Fig. 2 is a vertical section. Fig. 3 is a section taken on line 3—3 of Fig. 2. Fig. 4 is a section on line 4—4 of Fig. 1, the rim of the wheel being shown in elevation. Fig. 5 is a plan view of a modified form of the invention.

10 denotes a wheel-supported axle or support for a vehicle whereby the body and several parts of the vehicle are primarily supported. It will be understood that any suitable connection may be provided between this axle or support and the frame and that in practice any desired number of the wheels may be provided with the improved mount or driving-connection. In practice, suitable springs or cushions (not shown) are usually interposed between the axle 10 and the frame or body, these being usually connected to a bracket 11, in which an enlarged squared portion 12 of the axle is secured so the latter cannot revolve. The axle is extended outwardly beyond the bracket 11 and has an enlarged circular terminal 13 which is adapted to fit into a correspondingly shaped recess or pocket 14 formed in a wheel-spindle 15. The spindle has flat faces adapted to engage the upper and lower corresponding faces of the enlarged terminal 13 of the axle to secure the spindle against rotation with respect to the axle. A wheel is journaled on spindle 15 and to render the wheel dirigible, a pivotal connection is provided between the axle and the spindle which permits the spindle and wheel journaled thereon to be swung laterally with respect to the axle or body of the vehicle and to vary or determine the direction of travel of the vehicle. The pivotal connection is formed by a pin 16 which is secured in the axle-terminal and extends through a hole 17 in the spindle. Recess 14 in the spindle in which the axle terminal 13 fits, is cut away as at 18 to provide clearance between the axle and the spindle so the latter can be swung laterally with respect to the axle. Any suitable journal may be provided between the spindle and the wheel, a roller bearing 19 being shown.

The wheel 20 comprises a hub 21 which is journaled on the spindle, a body having inner and outer sides 22 and 23, rings 24, and a tire or felly 25 secured to the body by through-bolts 26. It will be understood that any desired tire may be used as the one illustrated forms no part of the invention. Sides 22 and 23 are secured by bolts to lugs 27 formed on the hub and medially disposed cross-bars or brackets 28 extend between the sides 22 and 23, the bracket and the sides being secured together by bolts. The spindle 16 is provided with a reduced portion 30 around which the hub of the dirigible wheel extends and has secured to its outer end an arm 31 which may be connected to the steering mechanism in any well known manner. This arm serves as means for shifting the spindle and wheel laterally about the pivotal connection between the spindle and the axle.

One of the advantages of the invention is to provide an improved dirigible wheel and mount in which the pivotal point about which the wheel swings is within the hub of the dirigible wheel and substantially in line with the vertical axis of the wheel. By so disposing the pivot the wheel can be easily swung since that portion of the wheel which contacts with the ground is substantially in line with the vertical axis of the wheel and thus it is very easy to turn the wheel. Furthermore, it becomes possible with this construction to locate the wheel pivot within the hub. It will be observed the spindle is non-revolubly held with respect to the axle by the construction and arrangement of the axle-terminal and pocket in the spindle. This feature relieves the pivot-pin 16 of binding strains and facilitates movement of the wheel in steering.

In motor vehicles it is customary to provide at least one pair of traction-wheels for driving the vehicle and one feature of the invention embodies an improved driving connection for the dirigible wheels. A driver 35 is journaled on a circular portion 10' of the axle and is held against endwise movement therein by a collar 10ª secured to the axle. The driver is usually formed of sections secured together for convenience in placing the driver in position on the axle. In the construction shown in Figs. 1 to 4 inclusive, the driver consists of a beveled gear having teeth 36 which are driven by a pinion 37 secured on a short shaft 38 which is journaled in bracket 11. Pinion 37 may be driven by any suitable or the usual means such as a universal joint 39 and shaft 40. Projecting laterally from the driver 35 and secured thereto are stirrups 43 which comprise studs 44 having their inner ends rigidly secured to the driver so that they will rotate therewith. In the traction-wheel a series of spokes 45 are secured at their inner ends in hub 21 and at their outer ends in brackets 28. A universal and flexible joint is provided between the stirrups and the spokes to maintain the traction-wheel in driving-relation with respect to the driver at all times while the traction-wheel is turned about its swivel connection. Each connection between the stirrups and the wheel-spokes comprises a bracket 47 formed of sections secured together by bolt 48 and having lugs 49 through which the studs of the stirrups are extended to form a sliding connection between the brackets and the studs to permit the wheel to swing and maintain its driving relation with respect to the drive-mechanism on the body of the vehicle. These brackets are connected by a ball 50 which is seated in the bracket to form a ball-and-socket joint between the spoke and bracket. The ball 50 is slidable on the spoke. These connections maintain the driver and the wheel at all times in driving relation and permit the wheel to be swung laterally about its pivotal connection with the spindle into angular relation with respect to the vehicle-body as necessary in steering the vehicle.

In dirigible traction-wheels it is desirable that the wheel be constantly driven and that the driving-connection shall be maintained despite variation of the angle of the traction-wheel and that this mechanism be simple. The driving-connection set forth is simple in construction and positively maintains the driving-relation of the wheel and the driving mechanism at all times.

In Fig. 5 is shown a slightly modified form of the invention in which the driver consists of a sprocket-wheel which is driven by a chain connected to the source of power in manner well understood in the art.

The invention is not to be understood as restricted to the details of construction set forth, but may be modified without departing from the spirit and scope of the invention.

Having thus described the invention, what I claim as new and desire to secure by Letters Patent, is:

1. The combination of a wheel comprising a hub, a fixed axle, a non-revoluble stub-spindle on which the hub is journaled, a pivotal connection between the outer end of the axle and the spindle substantially in line with the vertical axis of the wheel, within the hub and for permitting the spindle and wheel to be swung laterally, a driver disposed inwardly of the hub and mounted on the axle, and a connection between the driver and the wheel for driving the latter comprising a pivotal and laterally sliding joint.

2. The combination of a wheel comprising a hub, a fixed axle, a non-revoluble stub-spindle on which the hub is journaled, a pivotal connection between the outer end of the axle and the spindle substantially in line with the vertical axis of the wheel, within the hub and for permitting the spindle and wheel to be swung laterally, means for swinging the spindle laterally, a driver disposed inwardly of the hub and mounted on the axle, and a connection between the driver and the wheel for driving the latter comprising a pivotal and laterally and radially sliding joint.

3. The combination of a wheel comprising a hub, a fixed axle, a non-revoluble stub-spindle on which the hub is journaled, a pivotal connection between the outer end of the axle and the spindle substantially in line with the vertical axis of the wheel, within the hub and for permitting the spindle and wheel to be swung laterally, an arm at the outer end of the spindle for swinging the spindle laterally, a driver disposed inwardly of the hub and mounted on the axle, and a connection between the driver and the wheel for driving the latter comprising a pivotal and laterally and radially sliding joint.

4. The combination of a wheel comprising a hub, an axle or support, a stub-spindle on which the wheel is journaled, a pivotal connection between the axle and the spindle, substantially in the line of the vertical axis of the wheel and disposed within the hub, means for swinging the wheel laterally about said pivotal connection, a driver mounted on the frame, and a flexible and sliding joint driving-connection between the driver and the wheel.

5. The combination of a wheel comprising a hub, an axle or support, a stub-spindle on which the hub is journaled, a pivotal connection between the axle and the spindle disposed within the hub, means for swinging the wheel laterally about said pivotal connection, a driver mounted on the frame, and a flexible and sliding joint driving-connection between the driver and the wheel disposed outside of the hub.

6. The combination of a wheel comprising a hub, an axle, a spindle on which the hub is journaled, a pivotal connection between the spindle and the axle to permit lateral swing of the wheel and disposed in the hub, a driver journaled on the axle, and a flexible and sliding driving-connection between said driver and the wheel.

7. The combination of a wheel comprising a hub, an axle, a spindle on which the hub is journaled, a pivotal connection between the spindle and the axle to permit lateral swing of the wheel and disposed in the hub, a driver journaled on the axle, and a driving-connection between said driver and the wheel comprising laterally projecting studs on the driver pivotally and slidably connected to the wheel.

8. The combination of a wheel comprising a hub, an axle, a spindle on which the hub is journaled, a pivotal connection between the spindle and the axle to permit lateral swing of the wheel and disposed in the hub, a driver journaled on the axle, and a driving-connection between said driver and the wheel comprising laterally projecting studs and sliding and universal joints.

9. The combination of a wheel comprising a hub, a fixed axle or support having an enlarged terminal with horizontal faces, a spindle vertically pivoted to said axle, and having a recess or pocket therein for said terminal, said spindle being extended into the hub, said terminal and pocket being disposed in that portion of the spindle which is within the hub, and an arm on the outer end of said spindle for swinging the wheel laterally.

10. The combination of a wheel comprising a hub, a fixed axle or support having an enlarged terminal with horizontal faces, a spindle vertically pivoted to said axle, substantially in the line of the vertical axis of the wheel, and having a recess or pocket therein for said terminal, and an arm on the outer end of said spindle for swinging the wheel laterally.

11. The combination of a wheel comprising a hub, a fixed axle or support, a spindle on which the wheel is journaled and having a recess or pocket therein into which the axle is extended, a pivotal connection between the spindle and the axle disposed in the hub, means for swinging the wheel about said connection, and a driving-connection for the wheel.

12. The combination of a wheel comprising a hub, a fixed axle or support having an enlarged terminal with horizontal faces, a spindle vertically pivoted to said axle and having a recess or pocket therein for said terminal, said spindle being extended into the hub, said terminal and pocket being disposed in that portion of the spindle which is within the hub, means for swinging the wheel laterally, and a driving-connection for the wheel.

13. The combination of a wheel comprising a hub, a fixed axle or support having an enlarged terminal with horizontal faces, a spindle vertically pivoted to said axle, substantially in the line of the vertical axis of the wheel, and having a recess or pocket therein for said terminal, means for swinging the wheel laterally, and a driving-connection for the wheel.

14. The combination of a wheel comprising a hub, an axle or support, a stub-spindle on which the hub is journaled and pivoted to said axle, means for swinging the wheel laterally, and a driving-connection for the wheel comprising a driver, and laterally projecting studs, and flexible and sliding connections for the studs.

15. The combination of a wheel comprising a hub, an axle or support, a stub-spindle on which the hub is journaled and pivoted to said axle, means for swinging the wheel laterally, and a driving-connection for the wheel comprising a driver and laterally projecting studs, and sliding universal joints.

16. The combination of a wheel comprising a hub, an axle or support, a stub-spindle on which the hub is journaled and pivoted to said axle, means for swinging the wheel laterally and a driving-connection for the wheel comprising a driver and laterally projecting studs, and ball-and-socket joints.

17. The combination of a wheel comprising a hub, an axle or support, a stub-spindle on which the hub is journaled and pivoted to said axle, means for swinging the wheel laterally, and a driving-connection for the wheel comprising a driver and stirrups slidably connected to the wheel.

18. The combination of a wheel comprising a hub, an axle or support, a stub-spindle on which the hub is journaled and pivoted to said axle, means for swinging the wheel laterally, and a driving connection for the wheel comprising a driver and stirrups secured to the driver and flexible connections between the stirrups and the wheel.

19. The combination of a wheel comprising a hub, an axle or support, a stub-spindle on which the hub is journaled and pivoted to said axle, means for swinging the wheel laterally, and a driving-connection for the wheel comprising a driver and stirrups secured to the driver, and connections pivotally and slidably connected to the wheel.

20. The combination of a wheel comprising a hub, an axle or support, a stub-spindle on which the hub is journaled and pivoted to said axle, means for swinging the wheel laterally, and a driving-connection for the wheel comprising a driver and studs projecting laterally from the driver, and stud-guides pivotally connected to the wheel and to which the studs are slidably connected.

STEPHEN B. GRAY.

Witnesses:
LEONE S. RUSSELL,
WILLIAM P. BOND.